Dec. 23, 1958 A. P. DILLON 2,866,034
ELECTRICAL OUTLET RECEPTACLES
Filed Aug. 19, 1955
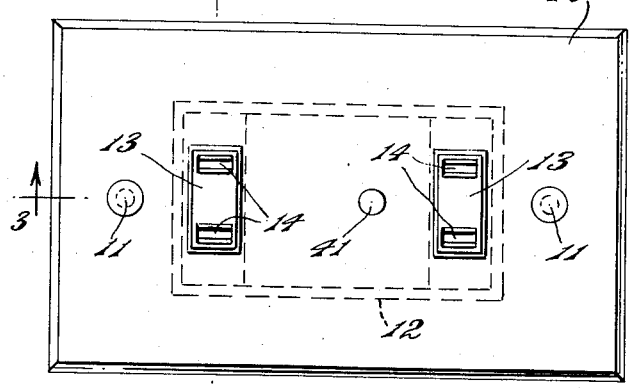
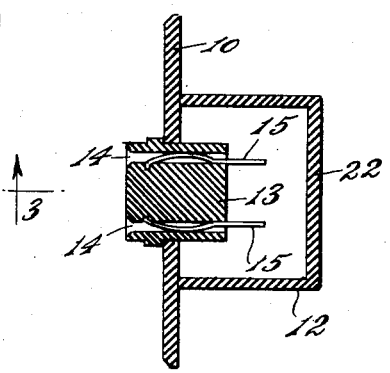
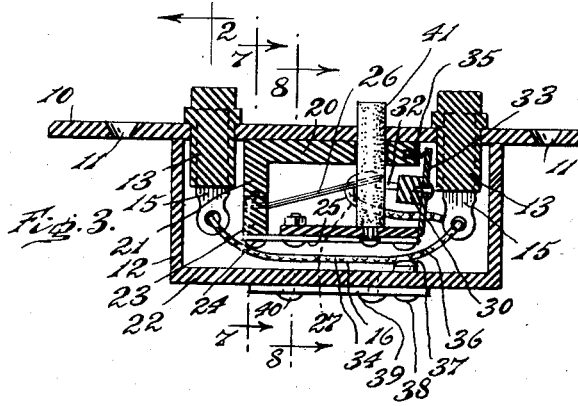
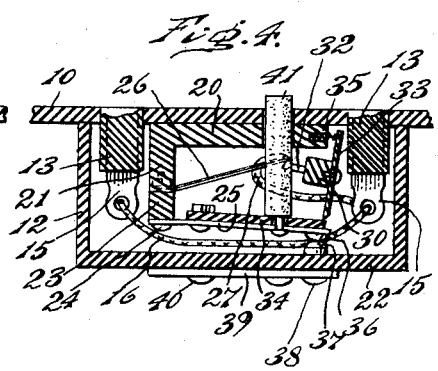
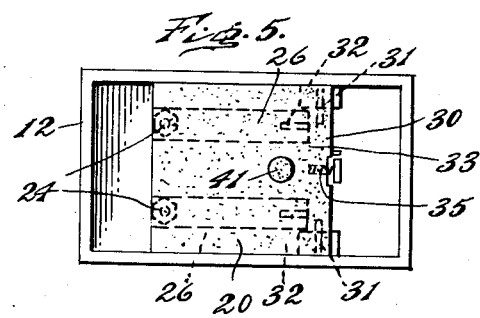
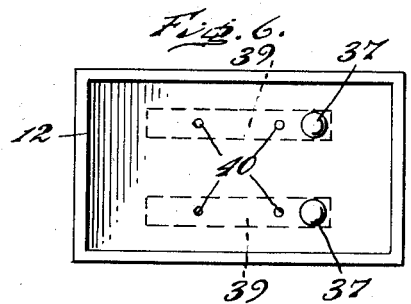
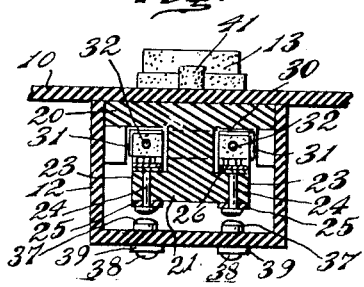
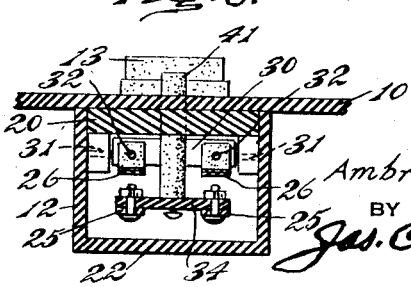
INVENTOR
Ambrose P. Dillon
BY
Jas. C. Hobensmith
ATTORNEY

United States Patent Office 2,866,034
Patented Dec. 23, 1958

2,866,034

ELECTRICAL OUTLET RECEPTACLES

Ambrose P. Dillon, Ardmore, Pa.

Application August 19, 1955, Serial No. 529,533

4 Claims. (Cl. 200—115.5)

This invention relates to an electrical outlet receptacle, that is to a device, adapted to be used in building wiring systems, having sockets for the reception of the prongs of the connection plugs used on extension cords for conveying current to various electrical appliances.

The device of the present invention has incorporated therein improved means for breaking the circuit in the event of an excess of current flow, and has means for easily and quickly resetting the device to operative condition after the fault causing such an excess has been corrected.

Heretofore various overload circuit breaking devices have been used in building circuits, the devices most commonly employed being fuses at the circuit distribution points, junction boxes, or panel boards. These, however, involved considerable inconvenience in the replacement of the fuses, requiring in most instances the employment of persons having at least some small degree of skill to effect such fuse replacements.

More recently there have come into use, in connection with electrical household appliances, connection plugs in which circuit breaking devices were incorporated. Some of such devices were also fuse controlled, necessitating the maintenance of a supply of special type fuses, and in others the circuit was broken by a thermally flexed bi-metallic device which, when current of greater amperage than was required in the appliance was passed therethrough, would be flexed by the resultant heat and thereby release spring tensioned parts to open the circuit. The devices of the latter type were usually provided with means for manually resetting the same after correction of the fault which caused the overload.

However, in the use of devices of the character last mentioned, prior to the conception of the invention set forth in my previous application for Letters Patent of the United States, filed February 17, 1955, Serial No. 488,804, no account was taken of the fact that in most building wiring systems one side of the circuit is usually neutral or grounded, and the other side of the circuit is "hot" or live, and in many instances the fault would occur on the live side of the circuit and the connection plug was so constructed and arranged that the circuit would be broken only on the neutral or grounded side. When an appliance is so connected a potential source of serious danger exists by reason of the failure of the device to open the circuit on the live side.

In my previous application for Letters Patent above mentioned there is shown and described a device adapted to be interposed between an ordinary electrical outlet and an ordinary pronged appliance connection plug, which is so constructed and arranged as to open the circuit on both sides whenever an overload of current may flow on either side.

The principal object of the present invention is to provide an electrical outlet receptacle adapted to be permanently installed as part of a building wiring system having circuit breaker means incorporated therein which will open the circuit on both sides whenever an overload of current flows on either side.

A further object of the present invention is to provide, in a device of the character aforesaid, improved means for indicating when the device has been operated to open the circuit, and for resetting the same.

A further object of the present invention is to provide a device of the character aforesaid which is so constructed and arranged that the same may be electrically connected into the building wiring system without any requirement, on the part of the person installing the same to make sure that the live and neutral wires are respectively connected on the proper sides.

The nature and characteristic features of the present invention will be more readily understood from the following description taken in connection with the accompanying drawing forming part hereof, in which:

Figure 1 is a front elevation of an electrical outlet receptacle embodying the main features of the present invention;

Fig. 2 is a section thereof taken on the line 2—2 of Fig. 1;

Fig. 3 is a longitudinal section thereof taken approximately on the line 3—3 of Fig. 1 with the parts shown in released or open circuit position;

Fig. 4 is a similar view but with the parts shown in the operative or closed circuit positions;

Fig. 5 is a front elevation of the housing with the cover plate, and certain of the parts carried thereby, removed;

Fig. 6 is a similar view but with more of the internal parts removed;

Fig. 7 is a transverse section taken on the line 7—7 of Fig. 3;

Fig. 8 is a similar transverse section taken approximately on the line 8—8 of Fig. 3.

It should, of course, be understood that the description and drawing herein are illustrative merely, and that various changes and modifications can be made in the device shown without departing from the spirit of the invention.

Referring to the drawing, in the particular embodiment of the invention therein shown, 10 is a face plate adapted to be secured to a baseboard or other part of the building structure, where the device is to be used, by means of screws (not shown) passing through the holes 11 provided in the face plate 10. On the rear or inside face of the face plate 10 a housing 12 is fixedly secured in any preferred manner. The face plate 10, and the housing 12 are made in any practical manner, preferably by molding the same of plastic insulating material.

The device as shown is of the duplex type, that is adapted for the mounting of two connection plugs therein simultaneously. For this purpose there are provided two connection sockets 13, extending into the housing 12 at each end thereof, and each provided with a pair of slots 14 for the reception of the connection prongs of a plug connector (not shown) of an extension cord. In each of the slots 14 of each of the connection sockets 13, there is mounted a spring contact plate 15. The inner ends of the contact plates extend into the spaces at the ends of the housing 12, the plates 15 on the respective sides being connected to each other by wires 16, and also being connected to other parts as hereinafter set forth by wires 27.

There is also secured, on the inner face of the face plate 10, a bracket member 20, at one end of which there is provided an arm portion 21, extending toward the rear wall 22 of the housing, said arm 21 having sidewise extensions 23 at the innermost end thereof. Bolts 24 pass through said extensions 23, and each of said bolts 24 serves to secure under its inner or head end thereof, one end of a spring arm 25, and at the other end of each of said bolts 24 there is secured a bimetallic member 26, each of which is adapted, when an excess amount of current passes therethrough, to be flexed to operate a trigger mechanism to be presently described. The free end of each of the bi-metallic members 26 is connected by a wire 27 to one of the contact plates 15 of one of the prong socket units 13 herein before described.

The trigger mechanism includes a rocker member 30 pivotally mounted within the interior of the housing 12 by means of pivot pins 31 extending into an extension of the bracket member 20 which is secured on the inside face of the face plate 10. The rocker member 30 is provided near each end thereof with an extending arm 32 which arms are respectively engaged by the free ends of the bi-metallic members 26.

The rocker member 30 is also provided with a trigger bar 33 the innermost edge of which is normally positioned to bear against an edge portion of a plate member 34 made of insulating material, which is carried by the spring arms 25. The innermost edge of the trigger bar 33 normally engages the edge portion of plate 34 which is carried by the spring arms 25. The trigger bar 33 is impelled to and normally maintained in such position by a coil spring 35.

Each of the spring arms 25 is provided at its free end with a contact member 36 which is adapted, in the operative position of the device (see Fig. 4) to engage a contact member 37 comprising the head of a rivet 38, which extends through the rear wall 22 of the housing and electrically engages a metallic connection strip 39 secured on the exposed face of the rear wall 22 of the housing 12, and each of said contact strips 39 is provided with a pair of connection screws 40 for the electrical connection of the supply wires to the contact members 37.

A resetting rod 41 extends through the face plate 10 and through the bracket 20. The rod 41 is connected at its inner end to the insulating plate 34 which is carried by the spring arms 25. It should be noted that, when the circuit is broken by the actuation of either one of the arms 32 of the rocker member 30, by the flexing of one of the bi-metallic members 26, the trigger bar 33 will release the plate 34 carried by the spring arms 25. The outer end of the resetting rod 40 will there project outwardly on the outside of the face plate to an appreciably greater extent thereby providing a visual indication when the circuit is broken.

The operation of the device as above described will now be easily understood.

In the event of a flow of current, for any reason, on either side of the circuit, in excess of the normal amount for which the bi-metallic members 26 are calibrated, one or the other of said members will become overheated, causing the same to flex sufficiently to bear down upon the arm 32 of the rocker member 30 which is engaged by the free end of said bi-metallic member. When the rocker member is thus actuated, the innermost edge of the trigger bar 33 will be swung to a position, against the tension of the coil spring 35, to release the plate member 34 which is normally held by the trigger bar 33 and permit the same to move to such position as to break the contact on each side between the contact members 36, carried by the ends of the spring arms 25, and the contact members 37 which are in electrical connection with the contact strips 39 to which the line wires (not shown) are connected by the screws 40.

In this manner the circuit will be broken on both sides, and this condition will be indicated by the greater extension of the outer end of the resetting rod 41, the inner end of which is connected to the plate member 34.

When it is desired to reset the device, it is only necessary to push the resetting rod 40 inwardly, causing the plate member 34 to be moved to a position where the trigger member 33 may be impelled by its coil spring 35 to the position shown in Fig. 4 of the drawing, in which position the innermost end of the trigger member 33 will hold the plate 34 in such position that the contact members 36 will be held in electrical contact with the contact members 37.

I claim:

1. An electrical outlet receptacle of the character described for use in an electrical circuit having two sides and comprising a housing, prong receiving connection sockets mounted in said housing and having metallic parts extending therein, a pair of independently operable thermally flexed members, one on each side of the circuit, electrically connected respectively to the internal portions of the metallic parts of the prong receiving connection sockets, a member internally mounted for movement within said housing having portions independently engaged and adapted to be shifted by the operation of either of the thermally flexed members, said movable member having a trigger member carried thereby, a pair of spring arms controlled by said trigger member each having a contact member at the free end thereof, a pair of contact members adapted to be normally contacted electrically by the contact members carried by said spring arms, and means for establishing electrical connections between main circuit wires and said last mentioned contact members.

2. An electrical outlet receptacle of the character described for use in an electrical circuit having two sides and comprising a housing, prong receiving connection sockets mounted in said housing and having metallic parts extending therein, a pair of independently operable thermally flexed members, one on each side of the circuit, electrically connected respectively to the internal portions of the metallic parts of the prong receiving connection sockets, a member internally mounted for movement within said housing having portions independently engaged and adapted to be shifted by the operation of either of the thermally flexed members, said movable member having a trigger member carried thereby, a bridge member normally held in operative position by said trigger member, a pair of spring arms carrying said bridge member and each having a contact member at the free end thereof, a pair of contact members adapted to be normally contacted electrically by the contact members carried by said arms, and means for establishing electrical connections between main circuit wires and said last mentioned contact members.

3. An electrical outlet receptacle of the character described for use in an electrical circuit having two sides and comprising a housing, prong receiving connection sockets mounted in said housing and having metallic parts extending therein, a pair of independently operable thermally flexed members, one on each side of the circuit, electrically connected respectively to the internal portions of the metallic parts of the prong receiving connection sockets, a member internally mounted for movement within said housing having portions independently engaged and adapted to be shifted by the operation of either of the thermally flexed members, said movable member having a trigger member carried thereby, a bridge member normally held in operative position by said trigger member, a pair of spring arms carrying said bridge member and each having a contact member at the free end thereof, a pair of contact members adapted to be normally contacted electrically by the contact members carried by said spring arms, means for establishing electrical connections between main circuit wires and said last mentioned contact members and means for indicating the opening and closing of the circuit and for resetting the same.

4. An electrical outlet receptacle of the character described for use in an electrical circuit having two sides and comprising a housing, prong receiving connection sockets mounted in said housing and having metallic parts extending therein, a pair of independently operable thermally flexed members, one on each side of the circuit, electrically connected respectively to the internal portions of the metallic parts of the prong receiving connection sockets, a member internally mounted for movement within said housing having portions independently engaged and adapted to be shifted by the operation of either of the thermally flexed members, said movable member having a trigger member carried thereby, a bridge member normally held in operative position by said trigger member, a pair of spring arms carrying said bridge member and each having a contact member at the free end thereof, a pair of contact members adapted to be normally contacted electrically by the contact members carried by said spring arms, means for establishing electrical connections between main circuit wires and said last mentioned contact members, and an externally extending member connected to one of the movable members for indicating the opening and closing of the circuit and for resetting the same.

References Cited in the file of this patent

UNITED STATES PATENTS

| | | |
|---|---|---|
| 1,939,194 | Angell | Dec. 12, 1933 |
| 1,990,176 | Fried | Feb. 5, 1935 |
| 2,070,305 | Jennings | Feb. 9, 1937 |
| 2,242,232 | Cappelle | May 20, 1941 |
| 2,229,843 | Frank et al. | Jan. 28, 1941 |
| 2,256,537 | Wulle | Sept. 23, 1941 |
| 2,282,967 | Keefe | May 12, 1942 |
| 2,528,591 | Getchell | Nov. 7, 1950 |
| 2,536,944 | Kirkby | Jan. 2, 1951 |
| 2,567,361 | Bean | Sept. 11, 1951 |
| 2,664,480 | Elliott | Dec. 29, 1953 |

FOREIGN PATENTS

| | | |
|---|---|---|
| 427,512 | Great Britain | Apr. 25, 1935 |